United States Patent [19]

Markandey

[11] Patent Number: 5,257,209
[45] Date of Patent: Oct. 26, 1993

[54] OPTICAL FLOW COMPUTATION FOR MOVING SENSORS

[75] Inventor: Vishal Markandey, Dallas, Tex.

[73] Assignee: Texas Instruments Incorporated, Dallas, Tex.

[21] Appl. No.: 928,521

[22] Filed: Aug. 10, 1992

Related U.S. Application Data

[63] Continuation of Ser. No. 543,622, Jun. 26, 1990, abandoned.

[51] Int. Cl.⁵ ............................................. G06F 15/50
[52] U.S. Cl. ................................. 364/516; 364/423; 382/1; 358/105; 358/109
[58] Field of Search ............... 358/103, 105, 108, 109, 358/125, 126; 382/1, 44, 45, 46; 364/456, 514, 516, 517, 423

[56] References Cited

U.S. PATENT DOCUMENTS

| | | | |
|---|---|---|---|
| 4,689,748 | 8/1987 | Hoffmann | 364/456 |
| 4,747,155 | 5/1988 | Dotson | 358/105 X |
| 4,796,090 | 1/1989 | Fraier | 358/109 X |
| 4,802,757 | 2/1989 | Pleitner et al. | 364/456 X |
| 4,912,770 | 3/1990 | Seto et al. | 358/105 X |
| 4,951,213 | 8/1990 | Baxter et al. | 364/456 |
| 4,969,036 | 11/1990 | Bhanu et al. | 358/105 |
| 4,988,189 | 1/1991 | Kroupa et al. | 364/456 X |
| 4,989,087 | 1/1991 | Pele et al. | 358/105 X |
| 5,030,984 | 7/1991 | Buchler et al. | 358/105 X |
| 5,034,986 | 7/1991 | Karmann et al. | 382/1 |
| 5,036,474 | 7/1991 | Bhanu et al. | 364/516 |
| 5,099,322 | 3/1992 | Gove | 358/105 |
| 5,109,425 | 8/1992 | Lawton | 382/1 X |
| 5,128,874 | 7/1992 | Bhanu et al. | 364/453 X |
| 5,150,426 | 9/1992 | Banh et al. | 382/1 X |
| 5,164,910 | 11/1992 | Lawson et al. | 364/516 |

OTHER PUBLICATIONS

Kanatani, "Transformation of Optical Flow by Camera Rotation", IEEE Transactions on Pattern Analysis and Machine Intelligence, vol. 10, No. 2, Mar. 1988, pp. 131–143.

*Primary Examiner*—Thomas G. Black
*Assistant Examiner*—Thomas S. Auchterlonie
*Attorney, Agent, or Firm*—W. Daniel Swayze; Richard L. Donaldson; Leo N. Heiting

[57] ABSTRACT

A method for using a computer-based imaging system, which may be in motion, to observe a moving object and determine its motion. The imaging system is used to obtain at least two images separated by a known time interval. The apparent motion of the observed object is expressed in terms of its true optical flow parameters with coefficients that represent the camera motion, projection geometry, and time interval. The result is a system of equations that may be solved for the true optical flow parameters.

9 Claims, 4 Drawing Sheets

$x' = x + \sigma x$ } Apparent object motion
$y' = y$ } due to sensor motion $x' = x + \sigma x$ } Apparent object motion
$y' = y + \sigma y$ } due to sensor and object motion $$
\begin{bmatrix} U'\varphi \\ V'\varphi \\ A' \\ B' \\ C' \\ D' \\ E' \\ F' \end{bmatrix} = \begin{bmatrix} 1 & w_z\Delta t & (w_y-v_x)\Delta t & -(w_x+v_y)\Delta t & 0 & 0 & 0 & 0 \\ -w_z\Delta t & 1 & 0 & 0 & (w_y-v_x)\Delta t & -(w_x+v_y)\Delta t & 0 & 0 \\ -2w_y\Delta t & w_x\Delta t & 1 & 0 & w_z\Delta t & 0 & 0 & 0 \\ w_x\Delta t & 0 & -w_z\Delta t & 1 & 0 & w_z\Delta t & 0 & 0 \\ 0 & -w_y\Delta t & -w_z\Delta t & 0 & 1 & 0 & 2\Delta t(w_y-v_x) & -\Delta t(w_x+v_y) \\ -w_y\Delta t & 0 & 0 & -w_z\Delta t & 0 & 1 & -\Delta t(w_x+v_y) & (w_y-v_x)\Delta t \\ 0 & 0 & -w_y\Delta t & 0 & w_x\Delta t & 0 & 1+a\Delta t & -2\Delta t(w_x+v_y) \\ 0 & 0 & 0 & 0 & 0 & w_x\Delta t & -w_z\Delta t & 1+a\Delta t \end{bmatrix} \begin{bmatrix} U\varphi \\ V\varphi \\ A \\ B \\ C \\ D \\ E \\ F \end{bmatrix}
$$

MATRIX EXPRESSION RELATING OBJECT'S APPARENT MOTION, ITS TRUE MOTION, AND CAMERA PARAMETERS.

*FIG. 5*

OPTICAL FLOW COMPUTATION FOR MOVING SENSORS

This application is a continuation of application Ser. No. 07/543,622, filed Jun. 26, 1990, now abandoned.

TECHNICAL FIELD OF THE INVENTION

This invention relates to computer vision, and more particularly to optical flow computations when both the observer and the target are moving.

BACKGROUND OF THE INVENTION

Computer vision has many applications, and is generally characterized by the use of a digital imaging system to produce an image, which is then analyzed with a computer for a subsequent decision. Many applications of computer vision involve identifying and locating objects in the image. Other applications of computer vision involve tracking a moving object. The camera or other image capturing device is the "observer" and the moving object is the "target".

To achieve computer vision in these applications, some methods use computations based on optical flow. In general terms, optical flow is understood by remembering that an image is a digitized representation of a continuous intensity variation of a scene in the physical world. The image changes as the objects in view, or the observer, or both, move with respect to each other. This movement gives rise to an optical flow, which associates a two dimensional velocity with each point on the two dimensional image plane. The result is an instantaneous velocity field on the image plane, which represents the optical flow of a number of points.

The optical flow reveals information about the shape of objects in the scene, which become determinate if the motion parameters are known. Other applications of optical flow include recovery of observer or target motion parameters.

A shortcoming of existing optical flow methods is the absence of methods for analyzing optical flow of a moving target that generates its own optical flow within an optical flow field due to a moving observer. Although one known method analyzes optical flow when the observer is moving, as well as the target, the observer's motion is only rotational and not translational. This method is described in an article by Ken-ichi Kanatani, entitled "Transformation of Optical Flow by Camera Rotation", IEEE Transactions on Pattern Analysis and Machine Intelligence, Vol. 10, No. 2, March 1988.

A need exists for a method of analyzing optical flow when both the observer and the target are moving with complete freedom of motion.

SUMMARY OF THE INVENTION

One aspect of the invention is a method for determining the movement of an object viewed with a computer vision system, when both the object and the observation point of the computer vision system are in motion. The computer vision system is used to obtain two frames of the object and its background scene, with the two frames being separated by a known time interval. The object's apparent optical flow parameters are expressed in terms of camera motion values and its true optical flow parameters. The result is a system of equations, which may be solved for the object's true optical flow parameters.

Another aspect of the invention is a system for use on a moving observation station for determining the motion of an observed object. An imaging system produces at least two digitized images of the object and its background. These images are separated by a known time interval. A computer is in data communication with the imaging system and receives the digitized images. The computer is programmed to determine the true optical flow parameters of the object, using the method described in the preceding paragraph.

A technical advantage of the invention is that if the motion of the observation point is known, the method can be used to determine the motion of a moving target. A moving target can be tracked and its movements predicted with an autonomous imaging system.

BRIEF DESCRIPTION OF THE DRAWINGS

FIG. 5 is a matrix expression that relates an object's apparent motion, its true motion, and camera motion parameters.

DETAILED DESCRIPTION OF THE INVENTION

Figure 1:
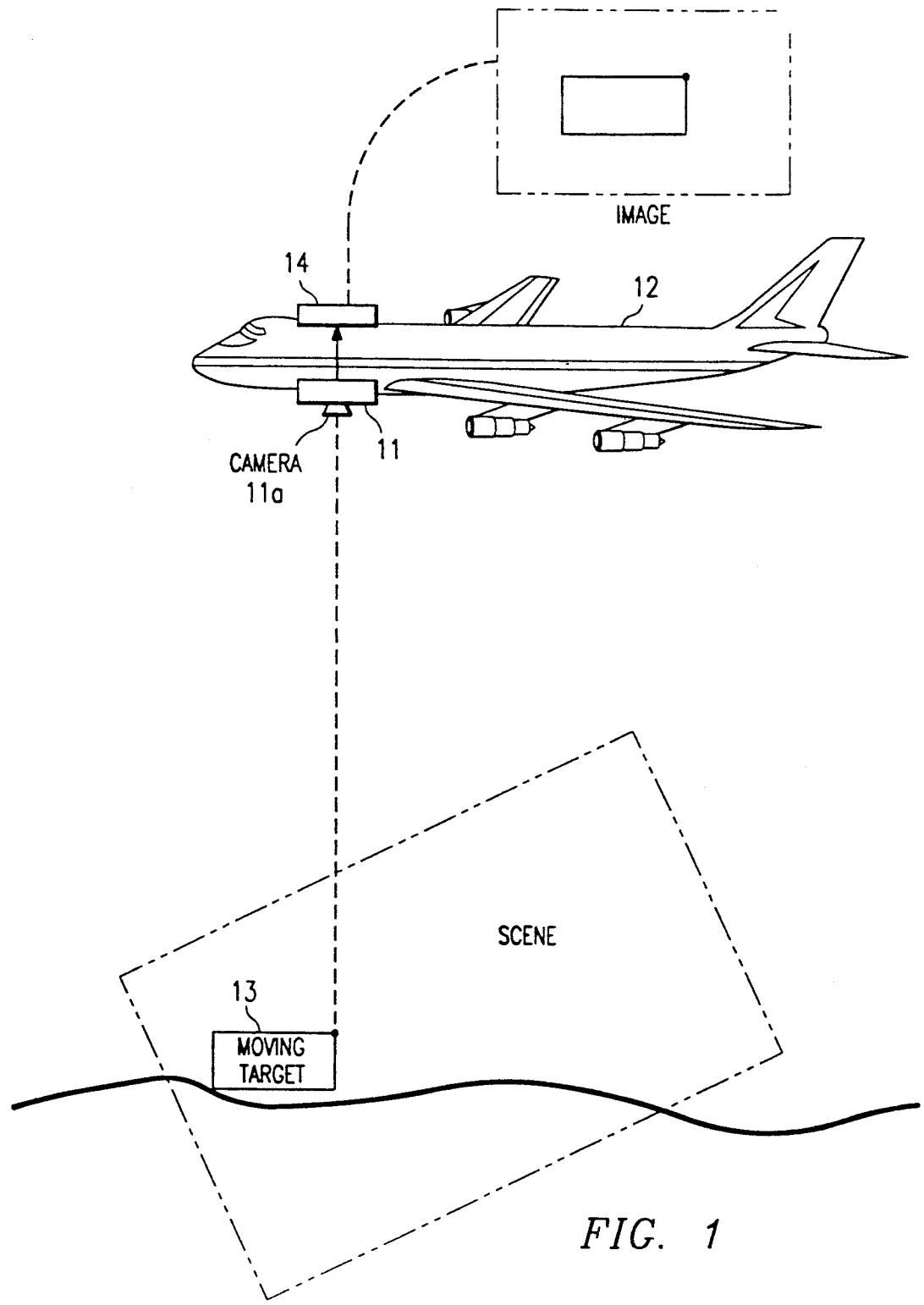
FIG. 1 illustrates an imaging system on board an aircraft in flight, used to obtain images of a moving object on the ground as part of implementation of the invention.

FIG. 1 is an example of a system that implements the method of the invention. The following description illustrates an implementation of the invention on a moving observation station, which in this example, is a moving vehicle on which an imaging system is mounted. However, the invention could be implemented in a number of other environments, such as an imaging system in a robotic apparatus. Also, the invention could be easily implemented in simulated, as well as real world, environments. An imaging system 11 is placed on board a moving vehicle 12, which in this example is an aircraft in flight. Target 13 is a moving object on the ground. Target 13 may be any shape or size.

Target 13 and its background are herein referred to as the "scene". The representation of the scene produced by imaging system 11 is herein referred to as the "image".

Imaging system 11 includes a camera 11a or any other device for capturing an image signal. The receiving lens of camera 11a, is referred to herein as the "observation point". Imaging system also includes a device for converting the image signal into digital values. Imaging systems 11 suitable for implementing the invention are known in the art of computer vision.

For purposes of this description, camera 11a and target 13 are assumed to have motion with translational and rotational components in three dimensional space. This is consistent with the most general form of the method of the invention. As will be clear from the explanation below, if motion is constrained with respect to one or more of these components, the appropriate terms may be set to zero.

If target 13 is not moving, but the observation point of imaging system 11 is moving, target 13 nevertheless has an apparent motion. If both the observation point and target 13 are moving, target 13 has an apparent motion that is a combination of the motion of the observation point and its own motion. The object of the invention is to separate the motion of the observation point from the apparent motion of target 13 so that the true motion of target 13 with respect to its background can be determined.

Camera 11a is used to provide at least two successive frames of the scene over a period of time. The time interval between any two frames is herein referred to as $\Delta t$. As will be clear from the explanation below, the invention operates with a minimum of two frames and one $\Delta t$. The duration of $\Delta t$ is related to accuracy in that during $\Delta t$, motion is assumed to be linear. Thus, the smaller the duration of $\Delta t$, the more likely the assumption is accurate. Also, the use of a series of measurements and calculations over a series of $\Delta t$'s can be used statistically to improve the accuracy of the method.

In addition to imaging system 11, aircraft 12 carries an on-board computer system 14 for processing the digital image generated by imaging system from the scene. Computer system 14 need not necessarily be on-board, but the invention is particularly advantageous for autonomous applications, in which an on-board computer system 14 is used to interpret the scene. The results may be used to trigger further on-board action or communicated to a remote station.

Imaging system 11 is assumed to provide perspective projection. This is one model of image formation, known in the art of computer vision. The perspective projection model provides a correspondence between points in the scene and points in the image by assuming an optical imaging system with an ideal pinhole at a fixed distance in front of the image plane. It is assumed that only light coming from the pinhole can reach the image plane, with each point on the image corresponding to a particular direction defined by a ray from that point through the pinhole.

Figure 2:
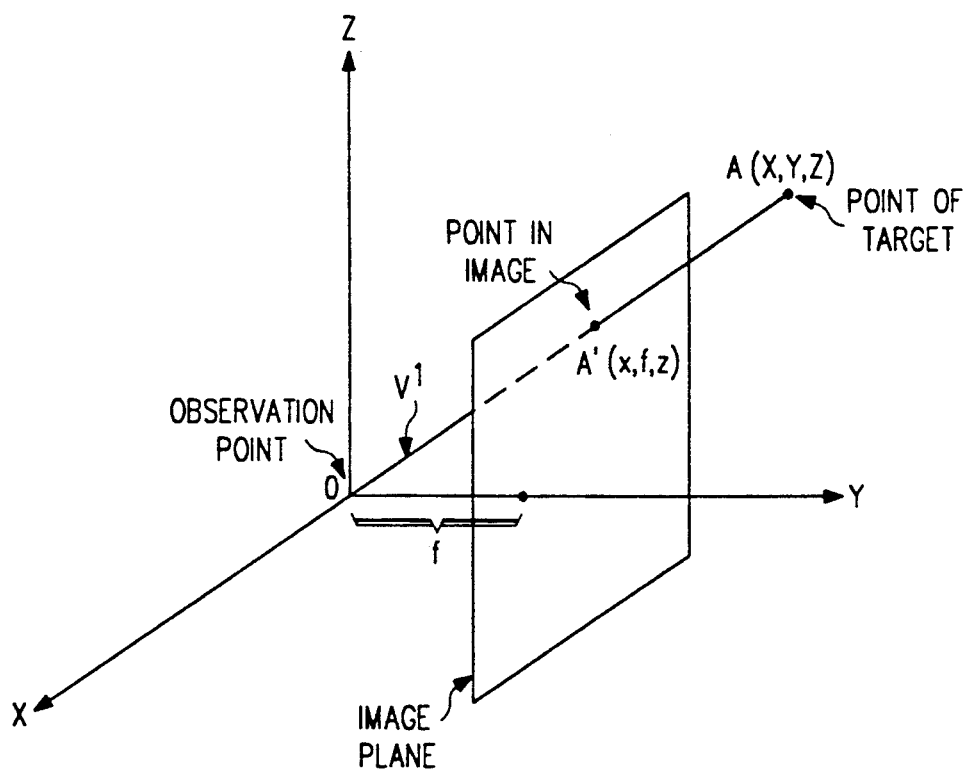
FIG. 2 illustrates perspective projection of a scene viewed by the imaging system of FIG. 1.

FIG. 2 illustrates the geometry of imaging system 11, with perspective projection. The center of projection of the perspective projection is the origin, O, of an XYZ coordinate system. This origin is located at camera 11a, or more specifically, its observation point. The image plane is at $Y=f$, where f is the focal length of the camera 11a. Point A represents a point of target 13, which may be any detectable point on the target surface.

A point A in the scene is projected to the point A' in the image plane, such that:

$$x = \frac{fX}{Z}$$

and $$y = \frac{fY}{Z}$$

where (X,Y,Z) is a vector connecting O to A, and $V'=(x,f,y)$ is a vector connecting O to A'.

The motion of camera 11a is assumed to be such that its rotational velocities about the three axes are $w_x$, $w_y$, and $w_z$, and its translational velocities are $v_x$, $v_y$, and $v_z$. For purposes of this description, $$V_x = \frac{v_x}{Z}$$

and $$V_y = \frac{v_y}{Z}$$

Also, $$a = \frac{v_z}{Z}$$

is a magnification parameter. These notations for $V_x$, $V_y$, and a are for convenience in the calculations below.

The values $w_x$, $w_y$, $w_z$, $V_x$, $V_y$, and a are assumed to be capable of measurement, and are referred to herein as the camera motion values. As explained below, these camera motion values and $\Delta t$ are used to express the apparent optical flow parameters of target 13 in terms of its true optical flow parameters. The result is a set of equations, which can be solved for the true optical flow parameters of target 13.

Figure 3A:
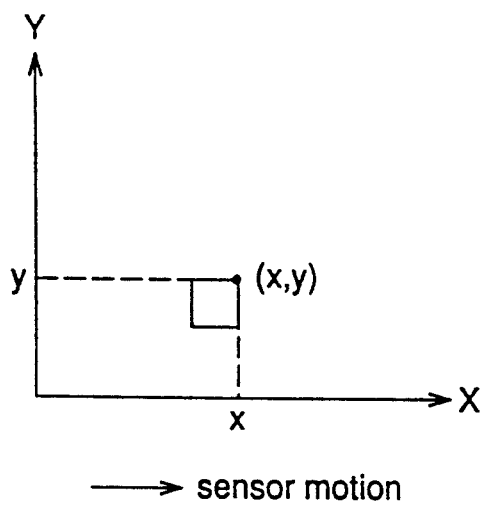
FIGS. 3A and 3B illustrate the apparent motion of a stationary object viewed with a moving imaging system.
Figure 3B:
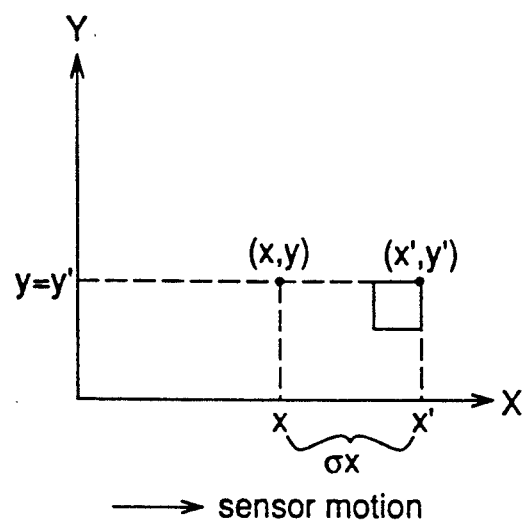

FIGS. 3A and 3B illustrate the apparent motion of a stationary object and its background as affected by motion of camera 11a, such as a stationary target 13 in a scene detected by imaging system 11. FIGS. 3A and 3B are separated by a time interval, $\Delta t$. For purposes of simplifying the illustration, the translational motion of camera 11a is in the x direction only.

Due to the motion of camera 11a, the point (x, y) will appear to move to a point (x', y') during $\Delta t$, such that:

$$x' = x + \delta x$$

$$y' = y + \delta y$$

where $\delta x$ and $\delta y$ are incremental values, computed according to geometric transformation algorithms as follows:

$$\delta x = (w_z y - w_y + V_x)\Delta t + (-x^2 w_y + x y w_x - xa)\Delta t$$

$$\delta y = (-w_z x + w_x + V_y)\Delta t + (-xy w_y + y^2 w_x - ya)\Delta t$$

These equations represent horizontal and vertical displacement, i.e., the distance that the point moves during $\Delta t$.

FIGS. 3A and 3B illustrate only the apparent motion of target 13 due to camera motion. As stated above, however, an object of the invention is to analyze optical flow when both the observation point, or origin O, and the point of interest, here a point associated with target 13, are moving. If two scenes are captured by imaging system 11 over a finite duration of time, i.e., $\Delta t$, target 13 will have moved in one respect because of its own motion, and in another respect because of the motion of imaging system 11.

Target 13, because it is in motion, generates an optical flow. Other objects in the scene, which may be moving at different speeds with respect to the ground or which may be stationary, generate a different optical flow. If a vector is drawn from the initial position to the final position of a given point in the image, the optical flow of that point is represented in vector form. The motion of each pixel in the image can be represented with an optical flow vector.

For a moving planar surface, viewed from a stationary observation point, the optical flow of any point is given by:

$$u(x,y) = u_0 + Ax + By + (Ex + Fy)x \quad (1)$$

$$v(x,y) = v_0 + Cx + Dy + (Ex + Fy)y \quad (2)$$

where $u_0$, $v_0$, A, B, C, D, E, and F are eight parameters that represent the "true" optical flow of any point in the scene.

These eight true optical flow parameters are determined by object motion, geometry, and imaging geometry. More specifically, where the planar surface patch is described as $Z = pX + qY + r$, the translations velocity is (a, b, c), and the rotation velocity is $(w_1, w_2, w_3)$, with respect to a reference point, $$u_0 = \frac{fa}{r}$$

$$v_0 = \frac{fb}{r}$$

$$A = pw_2 - \frac{pa + c}{r}$$

$$B = qw_2 - w_3 - \frac{qa}{r}$$

$$C = -pw_1 + w_3 - \frac{pb}{r}$$

$$D = -qw_1 - \frac{qb + c}{r}$$

$$E = \frac{1}{f}\left(w_2 + \frac{pc}{r}\right)$$

$$F = \frac{1}{f}\left(-w_1 + \frac{qc}{r}\right)$$

Proof of these equations is set out in the article referenced in the background section of this application, entitled "Transformation of Optical Flow by Camera Rotation".

If camera 11a is also moving, the optical flow of any point has the form:

$$u'(x', y') = u'_0 + A'x' + B'y' + (E'x' + Fy')x' \quad (3)$$

$$v'(x', y') = v'_0 + C'x' + D'y' + (E'x' + F'y')y' \quad (4)$$

These eight optical flow parameters, $u'_0$, $v'_0$, A', B', C', D', E', and F' represent the "apparent" optical flow parameters, which combine the motion of camera 11a and any motion of the object with which point (u', v') is associated. The similarity in form of the expressions for optical flow, regardless of whether camera 11a is moving, derives from the fact that a planar surface remains planar no matter from where it is viewed.

Figure 4A:
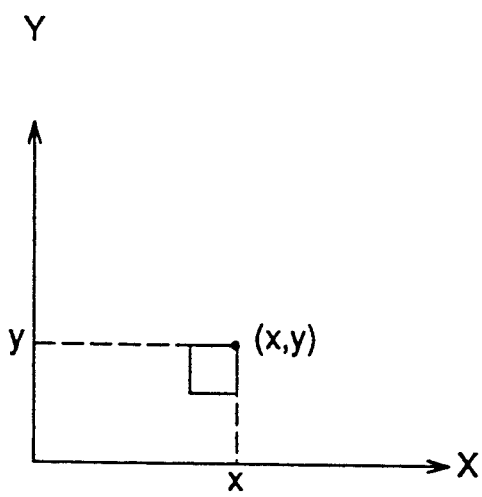
FIGS. 4A and 4B illustrate the apparent motion of a moving object viewed with a moving imaging system.
Figure 4B:
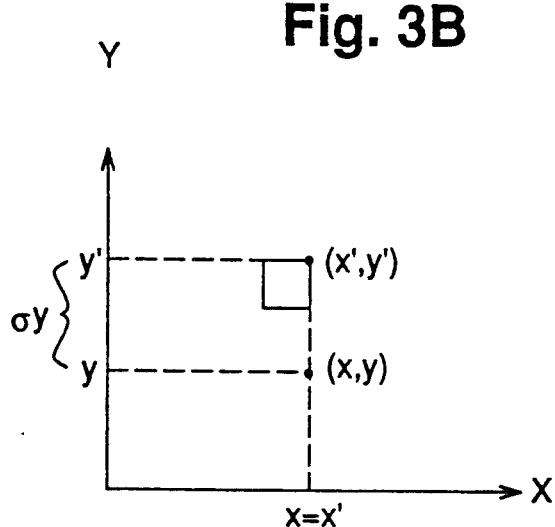
Figure 4B:
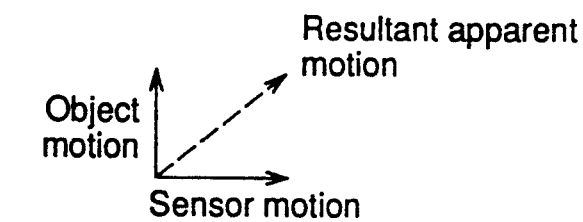

FIGS. 4A and 4B illustrate the optical flow generated by an object, such as target 13, when both the object and camera 11a are moving. For purposes of simplifying the illustration, the movement of the object is in the y direction only. A point (x,y) on the object has an apparent motion, which is a combination of camera motion illustrated in FIGS. 3A and 3B and the object's own motion.

If u and v are the optical flow velocity components, then under the transformation x to x' and y to y', u and v transform as:

$$\begin{bmatrix} u' \\ v' \end{bmatrix} = \begin{bmatrix} \frac{\delta x'}{\delta x} & \frac{\delta x'}{\delta y} \\ \frac{\delta y'}{\delta x} & \frac{\delta y'}{\delta y} \end{bmatrix} \begin{bmatrix} u \\ v \end{bmatrix} \quad (5)$$

Using the above expressions for x' and y', the following expressions are partial differential relationships between $\delta x$, $\delta x'$, $\delta y$, and $\delta y'$:

$$\frac{\delta x'}{\delta x} = 1 + (-2xw_y + yw_x - a)\Delta t \quad (6)$$

$$\frac{\delta x'}{\delta y} = (w_z + xw_x)\Delta t \quad (7)$$

$$\frac{\delta y'}{\delta x} = (-w_z - yw_y)\Delta t \quad (8)$$

$$\frac{\delta y'}{\delta y} = 1 + (2yw_x - xw_y - a)\Delta t \quad (9)$$

By substitution and matrix multiplication of the above expressions, u' and v' may be expressed as follows:

$$u' = u + u(-2xw_y + yw_x - a)\Delta t + v(w_z + xw_x)\Delta t \quad (10)$$

$$v' = v + v(2yw_x - xw_y - a)\Delta t + u(-w_z + yw_y)\Delta t \quad (11)$$

Equations (10) and (11) may be expressed in shorthand form as:

$$u' = u + \delta u \quad (12)$$

$$v' = v + \delta v \quad (13)$$

Substituting the expressions for u and v from equations (12) and (13) into equations (10) and (11), the following relationships between $\delta u$, $\delta v$, and $\Delta t$ are obtained:

$$\frac{\delta u}{\Delta t} = v_0 w_z + x(-2u_0 w_y - aA + Cw_z + v_0 w_x) + \quad (14)$$
$$y(u_0 w_x - aB + Dw_z) + x^2(Cw_x - 2Aw_y - aE) +$$
$$xy(Ew_z + Dw_x + Aw_x - 2Bw_y - aF) + y^2(Bw_x + Fw_z) +$$
$$x^3(-2Ew_y) + x^2 y(2Ew_x - 2Fw_y) + xy^2(2Fw_x)$$

$$\frac{\delta v}{\Delta t} = -u_0 w_z + x(-w_z A - v_0 w_y - aC) + y(-w_z B - u_0 w_y + \quad (15)$$
$$2v_0 w_x - aD) + x^2(-w_z E + w_y C) + xy(-w_z F - w_y A + 2Cw_x -$$
$$Dw_y - aE) + y^2(-Bw_y + 2Dw_x - aF) + x^2 y(-2Ew_y) +$$
$$xy^2(-2Fw_y + 2Ew_x) + y^3(2Fw_x)$$

The desired form for the optical flow equations, including camera motion, is the form of equations (3) and (4) above. The following expressions may be substituted into the left hand sides of (3) and (4):

$$u' = u + \delta u$$

$$v' = v + \delta v$$

The following expressions may be substituted into the right hand sides of (3) and (4):

$$x' = x + \delta x$$

-continued $$y' = y + \delta y$$
$$\ldots$$
$$F' = F + \delta F$$

If these expressions, and the expressions for $\delta x$ and $\delta y$ set out above, are substituted into equations (3) and (4), the following equations are obtained:

$$\delta u = (\delta u_o - Aw_y\Delta t + AV_x\Delta t + Bw_x\Delta t + BV_y\Delta t) + \quad (16)$$
$$x(\delta A - aA\Delta t - Bw_z\Delta t - 2Ew_y\Delta t + 2EV_x\Delta t + Fw_x\Delta t +$$
$$FV_y\Delta t) + y(Aw_z\Delta t + \delta B - aB\Delta t - w_y F\Delta t + V_x F\Delta t) +$$
$$x^2(-Aw_y\Delta t + \delta E - 2aE\Delta t - w_z F\Delta t) + xy(Aw_x\Delta t -$$
$$Bw_y\Delta t + 2Ew_z\Delta t + \delta F - 2aF\Delta t) + y^2(Bw_x\Delta t + Fw_x\Delta t) +$$
$$x^3(-2Ew_y\Delta t) + x^2y(2Ew_x\Delta t - 2Fw_y\Delta t) + xy^2(2Fw_x\Delta t)$$

$$\delta v = (\delta v_o - Cw_y\Delta t + CV_x\Delta t + Dw_x\Delta t + DV_y\Delta t) + \quad (17)$$
$$x(\delta C - aC\Delta t - Dw_z\Delta t + Ew_x\Delta t + EV_y\Delta t) + y(Cw_z\Delta t +$$
$$\delta D - aD\Delta t - Ew_y\Delta t + EV_x\Delta t + 2Fw_x\Delta t + 2FV_y\Delta t) +$$
$$x^2(-Cw_y\Delta t - Ew_z\Delta t) + xy(Cw_x\Delta t - Dw_y\Delta t + \delta E -$$
$$2aE\Delta t - 2Fw_z\Delta t) + y^2(Dw_x\Delta t + Ew_z\Delta t + \delta F - 2aF\Delta t) +$$
$$x^2y(-2Ew_y\Delta t) + xy^2(2Ew_x\Delta t - 2Fw_y\Delta t) + y^3(2Fw_x\Delta t)$$

Equations (14) and (16) provide two expressions for $\delta u$ and equations (15) and (17) provide two equations for $\delta v$. These expressions are second order polynomials in x and y, thus the unknown parameters can be determined by comparing coefficients. This results in the following expressions:

$$\delta u_0 = Aw_y\Delta t - AV_x\Delta t - Bw_x\Delta t - BV_y\Delta t + v_0 w_z\Delta t \quad (18)$$

$$\delta v_0 = -u_0 w_z\Delta t + Cw_y\Delta t - CV_x\Delta t - Dw_x\Delta t - DV_y\Delta t \quad (19)$$

$$\delta A = -2u_0 w_y\Delta t + Cw_z\Delta t + v_0 w_x\Delta t + Bw_z\Delta t + 2Ew_y\Delta t - 2EV_x\Delta t - Fw_x\Delta t - FV_y\Delta t \quad (20)$$

$$\delta B = u_0 w_x\Delta t + Dw_z\Delta t - Aw_x\Delta t + Fw_y\Delta t - FV_x\Delta t \quad (21)$$

$$\delta C = -Aw_z\Delta t - v_0 w_y\Delta t + Dw_z\Delta t - Ew_x\Delta t - EV_y\Delta t \quad (22)$$

$$\delta D = -Bw_z\Delta t - u_0 w_y\Delta t + 2v_0 w_x\Delta t - Cw_z\Delta t + Ew_y\Delta t - EV_x\Delta t - 2Fw_x\Delta t - 2FV_y\Delta t \quad (23)$$

$$\delta E = -Aw_y\Delta t + Cw_x\Delta t + aE\Delta t + Fw_z\Delta t \quad (24)$$

$$\delta F = -Bw_y\Delta t + Dw_x\Delta t + aF\Delta t - Ew_z\Delta t \quad (25)$$

Equations (18)–(25) are a system of equations that can be expressed in matrix form. Using the fact that:

$$u'_0 = u_0 + \delta u_0$$
$$v'_0 = v_0 + \delta v_0$$
$$\ldots$$
$$F' = F + \delta F$$

we obtain the solution matrix set out in FIG. 5. This matrix represents a system of equations, which relate the optical flow parameters before and after camera motion, in terms of the motion parameters of the camera.

The matrix expression in FIG. 5 has the form $A = MB$, where A represents the optical flow parameters with camera motion, B represents the optical flow parameters without camera motion, and M is a matrix whose components are functions of camera motion parameters and $\Delta t$.

A can be obtained from an observed optical flow field by performing a least squares fit to the form of equations (1) and (2). M can be computed from known motion parameters of camera 11a. With A and M thus determined, B can be obtained from the expression:

$$B = M^{-1}A$$

As stated above, this method is for the general case that accommodates any kind of camera and target motion. The same method can be used for special cases, where one or more motions are constrained. In fact, these special cases are simpler to solve because the appropriate motion terms may be set to zero, which makes the solution matrix easier to solve.

Other Embodiments

Although the invention has been described with reference to specific embodiments, this description is not meant to be construed in a limiting sense. Various modifications of the disclosed embodiments, as well as alternative embodiments will be apparent to persons skilled in the art. It is, therefore, contemplated that the appended claims will cover all modifications that fall within the true scope of the invention.

What is claimed is:

1. A method for determining motion of an object viewed with a moving imaging system having a camera, comprising the steps of:
   obtaining a first image of a first scene including the object;
   obtaining a second image of a second scene including said object, said second image being separated by a predetermined time interval from said first image, the motion of said object corresponding to apparent optical flow parameters and true optical flow parameters, and the camera of said moving imaging system having camera motion values;
   expressing the apparent optical flow parameters as equations having said true optical flow parameters with coefficients in terms of said camera motion values and of said predetermined time interval;
   determining said camera motion values from rotational and translational velocities of said camera and from the geometry of a projection to said image;
   solving said equations for said true optical flow parameters; and
   using said true optical flow parameters to determine said motion of an object.

2. The method of claim 1, wherein said method further comprises the step of determining said apparent optical flow parameters of said object from an observed optical flow field.

3. The method of claim 2, wherein said step of determining said apparent optical flow parameters comprises the step of applying at least square fit to a known form of said parameters.

4. The method of claim 1, wherein said method further comprises the step of determining said camera motion values.

5. The method of claim 1, wherein said step of expressing the apparent optical flow parameters as equations having true optical flow parameters comprises the step of providing a system of eight optical flow parameters.

6. The method of claim 1, wherein said step of expressing the apparent optical flow parameters as equations having true optical flow parameters comprises the step of deriving incremental optical flow velocity components from partial differentiation techniques.

7. A system for use on a moving observation system having a camera, for determining motion of an observed object, comprising:

an imaging system for producing at least two digitized images of said observed object and a background of said observed object, said digitized images being separated in time by a predetermined time interval, the motion of said observed object corresponding to apparent optical flow parameters and true optical flow parameters, and the camera of said moving observation system having camera motion values; and a computer in communication with said imaging system, for receiving said digitized images and for determining the said true optical flow parameters of said observed object, said computer including instructions to solve for said true optical flow parameters, wherein said true optical flow parameters are expressed in terms of said apparent optical flow parameters with coefficients representing said camera motion values and said time interval, said camera motion values being determined from rotational and translational velocities of said camera and from the geometry of a projection of said image.

8. The system of claim 7, wherein said computer is programmed to determine said apparent and true optical flow parameters from an optical flow field from said digitized images produced by said imaging system.

9. The system of claim 7, wherein said computer is programmed to receive input signals from camera motion measuring devices of said system and to use said input signals to determine said coefficients.

* * * * *